United States Patent
Rousseau et al.

(10) Patent No.: US 10,746,269 B2
(45) Date of Patent: Aug. 18, 2020

(54) LINEAR ACTUATOR FOR MOTION SIMULATOR

(71) Applicant: D-BOX TECHNOLOGIES INC., Québec (CA)

(72) Inventors: Robert Rousseau, Québec (CA); Steve Boulais, Québec (CA); Benoit Lupien, Québec (CA); Jean-Francois Menard, Québec (CA)

(73) Assignee: D-BOX TECHNOLOGIES INC., Québec (CA)

( * ) Notice: Subject to any disclaimer, the term of this patent is extended or adjusted under 35 U.S.C. 154(b) by 271 days.

(21) Appl. No.: 15/523,437

(22) PCT Filed: Oct. 30, 2015

(86) PCT No.: PCT/US2015/058305
§ 371 (c)(1),
(2) Date: May 1, 2017

(87) PCT Pub. No.: WO2016/070038
PCT Pub. Date: May 6, 2016

(65) Prior Publication Data
US 2017/0307054 A1    Oct. 26, 2017

Related U.S. Application Data

(60) Provisional application No. 62/073,453, filed on Oct. 31, 2014.

(51) Int. Cl.
*F16H 25/24*    (2006.01)
*F16H 25/20*    (2006.01)
(Continued)

(52) U.S. Cl.
CPC ......... *F16H 25/24* (2013.01); *F16H 25/2006* (2013.01); *F16H 25/2204* (2013.01); *F16K 31/50* (2013.01); *F16H 2025/2075* (2013.01)

(58) Field of Classification Search
CPC .. F16H 25/24; F16H 25/2006; F16H 25/2204; F16H 2025/2075; F16K 31/50
See application file for complete search history.

(56) References Cited

U.S. PATENT DOCUMENTS 3,202,009 A * 8/1965 Geyer ................. F16H 25/2204
74/89.28
4,307,799 A    12/1981 Zouzoulas
(Continued)

FOREIGN PATENT DOCUMENTS

WO    2012120670 A2    9/2012
WO    2014/085803 A2    6/2014
WO    2014085807 A2    6/2014

OTHER PUBLICATIONS

European Search Report for corresponding application EP15855032; Report dated Feb. 14, 2018.
(Continued)

*Primary Examiner* — Zakaria Elahmadi
(74) *Attorney, Agent, or Firm* — Cantor Colburn LLP (57) ABSTRACT

A linear actuator comprises a motor for producing a bi-directional rotational output. A casing is connected to the motor at a proximal end, the casing having an inner cavity defining a joint surface. A threaded shaft is within the inner cavity of the casing and actuated by the motor for rotation. A sliding tube assembly has a sliding tube in sliding arrangement with the inner cavity of the casing for moving in translation in an axial direction relative to the casing. A pair of traveling nuts is connected to the sliding tube assembly for moving with the sliding tube in the axial direction, the traveling nuts being operatively engaged to the threaded shaft for converting a rotational motion of the threaded shaft into a translation of the sliding tube, the traveling nuts being
(Continued)

on opposite sides of a member of the sliding tube assembly connecting the traveling nuts to the sliding tube.

21 Claims, 4 Drawing Sheets

(51) Int. Cl.
  *F16H 25/22* (2006.01)
  *F16K 31/50* (2006.01)

(56) References Cited

U.S. PATENT DOCUMENTS

| | | | |
|---|---|---|---|
| 4,585,515 A | 4/1986 | Maa | |
| 5,931,739 A | 8/1999 | Layer | |
| 6,698,301 B2 | 3/2004 | Blaurock | |
| 7,934,773 B2 | 5/2011 | Boulais | |
| 8,024,987 B2* | 9/2011 | Yamaguchi | F16H 1/225 74/89.23 |
| 8,358,096 B2* | 1/2013 | Bastholm | F16H 25/2015 192/138 |
| 8,601,952 B2 | 12/2013 | Tamai | |
| 9,664,267 B2* | 5/2017 | Rousseau | F16D 3/68 |
| 9,863,513 B2* | 1/2018 | Rousseau | F16H 25/20 |
| 2007/0137330 A1* | 6/2007 | Hoth | F16H 25/2472 74/89.23 |
| 2007/0169578 A1* | 7/2007 | Christensen | F16H 25/2021 74/89.37 |
| 2010/0139429 A1* | 6/2010 | Ku | B66F 3/08 74/89.37 |
| 2010/0186529 A1* | 7/2010 | Chiang | F16H 25/2015 74/89.37 |
| 2010/0319472 A1* | 12/2010 | Wei | F16H 25/2021 74/89.37 |
| 2011/0174100 A1* | 7/2011 | Fukano | F16H 25/24 74/89.36 |
| 2012/0222510 A1* | 9/2012 | Winther | F16H 25/20 74/89.23 |
| 2013/0283947 A1* | 10/2013 | Yamada | F16H 25/2021 74/89.23 |
| 2014/0298934 A1* | 10/2014 | Marek | F16H 25/20 74/89.33 |
| 2015/0240922 A1* | 8/2015 | Parker | F16H 25/2015 74/89.37 |
| 2015/0376929 A1* | 12/2015 | Scheuring | F16H 25/24 74/89.38 |
| 2016/0341302 A1* | 11/2016 | Lin | F16H 57/0497 |

OTHER PUBLICATIONS

International Search Report for corresponding application PCT/US2015/058305 filed Oct. 30, 2015; dated Jan. 21, 2016.
Written Opinion for corresponding application PCT/US2015/058305 filed Oct. 30, 2015; dated Jan. 21, 2016.
Japanese Office Action for corresponding Patent Application No. 2017-523220; dated Aug. 30, 2019.

* cited by examiner

LINEAR ACTUATOR FOR MOTION SIMULATOR

CROSS-REFERENCE TO RELATED APPLICATION

The present application claims priority of U.S. Provisional Patent Application No. 62/073,453, filed in Oct. 31, 2014, the content of which is incorporated herein by reference.

FIELD OF THE APPLICATION

The present application relates to linear actuators as used with motion simulators or in motion simulation, for instance to displace an occupant or occupants of a platform in synchrony with a sequence of video images or with an audio track.

BACKGROUND OF THE ART

In the video and televised entertainment industry, there is an increasing demand for enhancing the viewing experience of a viewer. Accordingly, there has been numerous innovations to improve the image and the sound of viewings. Motion simulation has also been developed to produce movements of a motion platform (e.g., a seat, a chair) in synchrony with sequences of images of a viewing. For instance, U.S. Pat. Nos. 6,585,515 and 7,934,773 are two examples of systems that have been created to impart motion to a seat, to enhance a viewing experience.

Electro-mechanical linear actuators are commonly used in such motion platforms. These linear actuators must often be capable of producing low and medium amplitude outputs, at low or medium frequency, for a high number of strokes. Moreover, these linear actuators must support a portion of the weight of a platform and its occupant(s).

Figure 1:
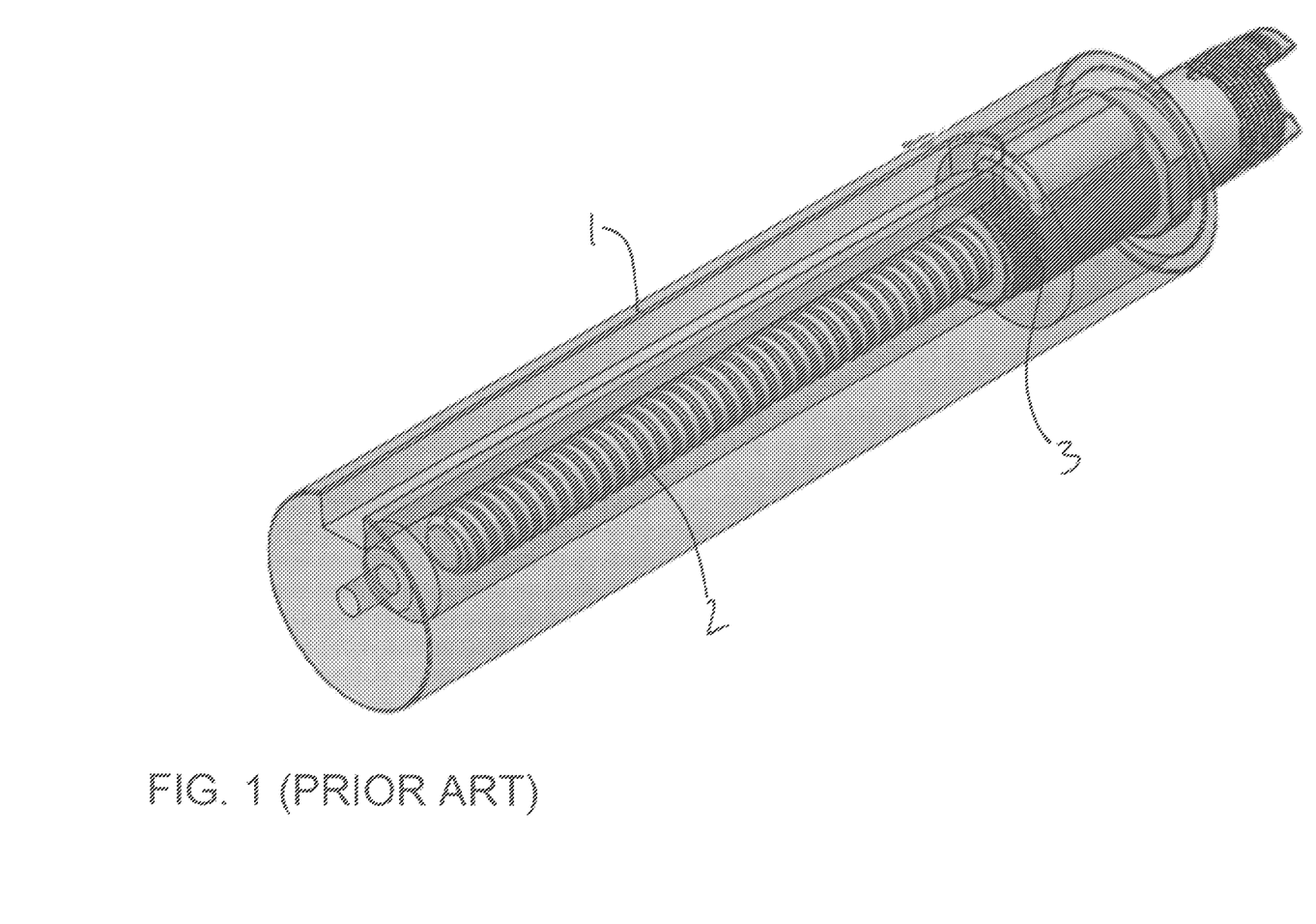
FIG. 1 is a see-through perspective view of a driven group of a linear actuator for motion simulators in accordance with the prior art.

While the linear actuators expand in their axial dimension to raise a motion platform, the loads applied on the linear actuator are not limited to being in the axial direction, and may have other components, such as radial components, for instance, based on how the linear actuator is connected between the ground and the motion platform. Accordingly, linear actuators may be subjected to loads that could, over time and over cycles, lead them to failure. FIG. 1 shows a prior art driven group of a linear actuator, with a sliding tube piston 1 of the type slidingly received in a cylindrical casing, a threaded shaft 2 and a traveling nut 3 interfacing the threaded shaft 2 to the sliding tube piston 1. It is observed that the traveling nut 3 is secured to the sliding tube piston 1 so as to form an integral unit that moves together. A rotation of the threaded shaft 2 is converted into a translational motion of the sliding tube piston 1, in part because of the traveling nut 3. As loads are applied to the end of the sliding tube piston 1, such loads will be transmitted to the traveling nut 3. Non-axial loads may impact the life of the traveling nut 3 due to the leveraging effect of the sliding tube piston 1 on the traveling nut 3, for such non-axial loads.

SUMMARY OF THE APPLICATION

It is therefore an aim of the present disclosure to provide a linear actuator that addresses issues associated with the prior art.

Therefore, in accordance with a first embodiment of the present application, there is provided a linear actuator comprising: a motor for producing a bi-directional rotational output; a casing connected to the motor at a proximal end, the casing having an inner cavity defining a joint surface; a threaded shaft within the inner cavity of the casing and actuated by the motor for rotation; a sliding tube assembly having a sliding tube in sliding arrangement with the inner cavity of the casing for moving in translation in an axial direction relative to the casing; and a pair of traveling nuts connected to the sliding tube assembly for moving with the sliding tube in the axial direction, the traveling nuts being operatively engaged to the threaded shaft for converting a rotational motion of the threaded shaft into a translation of the sliding tube, the traveling nuts being on opposite sides of a member of the sliding tube assembly connecting the traveling nuts to the sliding tube.

Still further in accordance with the first embodiment, the traveling nuts are threadingly engaged to the member.

Still further in accordance with the first embodiment, a thread pitch between at least one of the traveling nuts and the member is different than a thread pitch of the threaded shaft.

Still further in accordance with the first embodiment, the traveling nuts each are rolled balls screw units, each said rolled ball screw units having balls operatively received in a helical raceway of the threaded shaft.

Still further in accordance with the first embodiment, a hemi-spherical joint surface is at a distal end of the sliding tube for interfacing the linear actuator to a socket of a structure.

Still further in accordance with the first embodiment, the member of the sliding tube assembly is a carriage positioned in an inner cavity of the sliding tube.

Still further in accordance with the first embodiment, the carriage is a disk with a throughbore for the threaded shaft to pass through, with the traveling nuts secured to opposite sides of the disk.

Still further in accordance with the first embodiment, at least one joint provides a first rotational degree of freedom between the carriage and the sliding tube, about an axis transverse to the axial direction.

Still further in accordance with the first embodiment, the axis of the first rotational degree of freedom is perpendicular to the axial direction.

Still further in accordance with the first embodiment, there are two of said joint, with a first of said joints providing the first rotational degree of freedom, and a second of said joints providing a second rotational degree of freedom about another axis transverse to the axial direction Still further in accordance with the first embodiment, the axes of the first rotational degree of freedom and of the second rotational degree of freedom lie in a common plane.

Still further in accordance with the first embodiment, the axial direction is normal to the common plane.

Still further in accordance with the first embodiment, a play separates an outer surface of the carriage from a surface of the inner cavity, the play being between 0.006" and 0.014".

Still further in accordance with the first embodiment, the at least one joint comprises a cylindrical roller projecting radially from the carriage, and a circular bore in the sliding tube housing the cylindrical roller.

In accordance with a second embodiment of the present disclosure, there is provided a linear actuator comprising: a motor for producing a bi-directional rotational output; a casing connected to the motor at a proximal end, the casing having an inner cavity defining a joint surface; a threaded shaft within the inner cavity of the casing and actuated by the motor for rotation; a sliding tube in sliding arrangement with the inner cavity of the casing for moving in translation in an axial direction relative to the casing; a carriage within the sliding tube and connected to the sliding tube for moving with the sliding tube in an axial direction; at least one joint providing a first rotational degree of freedom between the carriage and the sliding tube, about an axis transverse to the axial direction; and at least one traveling nut connected to the carriage for moving with the sliding tube in the axial direction, the at least one traveling nut being operatively engaged to the threaded shaft for converting a rotational motion of the threaded shaft into a translation of the sliding tube.

Further in accordance with the second embodiment, the axis of the first rotational degree of freedom is perpendicular to the axial direction.

Still further in accordance with the second embodiment, there are two of said joint, with a first of said joints providing the first rotational degree of freedom, and a second of said joints providing a second rotational degree of freedom about another axis transverse to the axial direction.

Still further in accordance with the second embodiment, the axes of the first rotational degree of freedom and of the second rotational degree of freedom lie in a common plane.

Still further in accordance with the second embodiment, the axial direction is normal to the common plane.

Still further in accordance with the second embodiment, the carriage is a disk with a throughbore for the threaded shaft to pass through.

Still further in accordance with the second embodiment, a play separates an outer surface of the carriage from a surface of the inner cavity, the play being between 0.006" and 0.014".

Still further in accordance with the second embodiment, wherein the at least one joint comprises a cylindrical roller projecting radially from the carriage, and a circular bore in the sliding tube housing the cylindrical roller.

DESCRIPTION OF THE PREFERRED EMBODIMENTS

Figure 2:
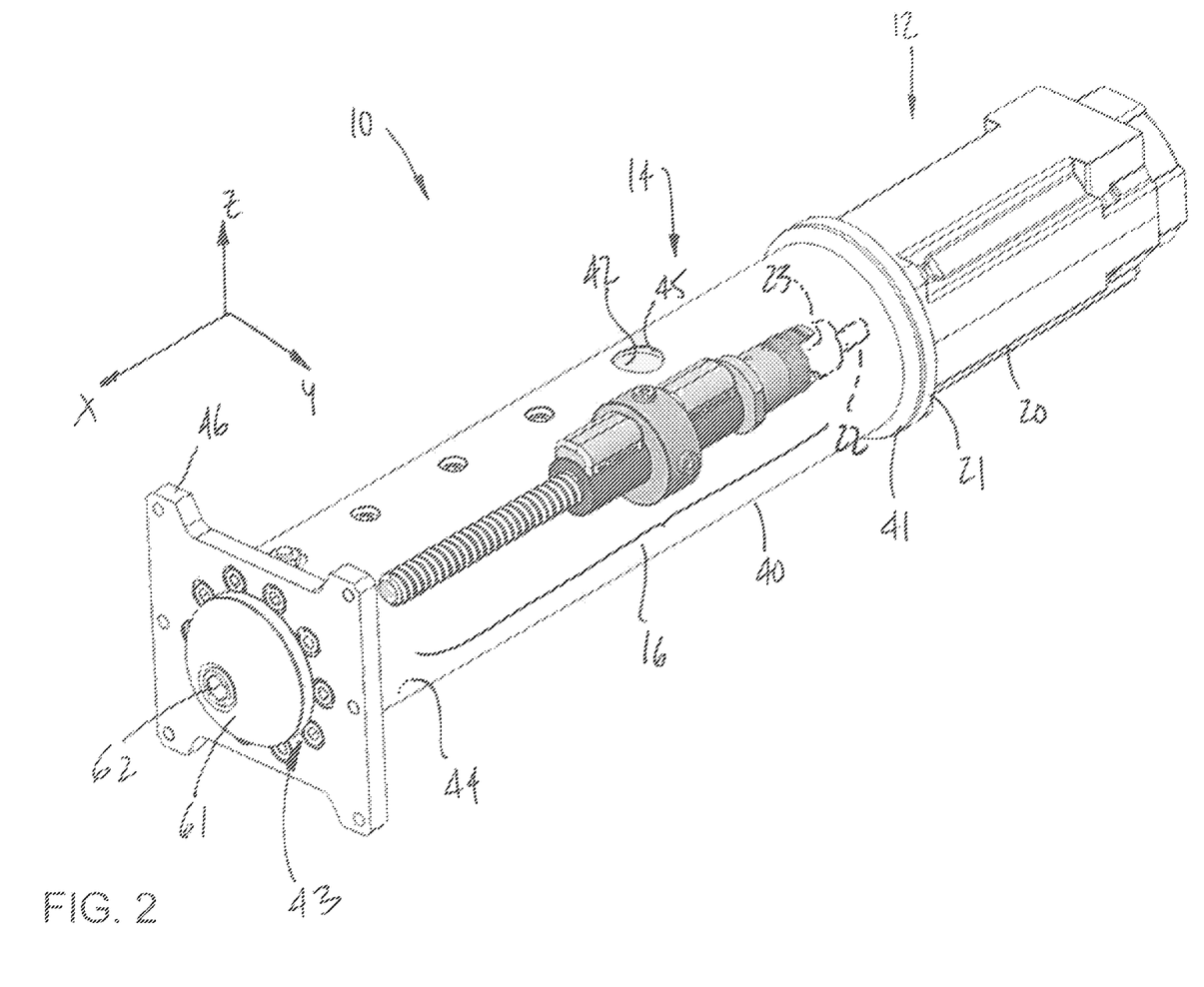
FIG. 2 is a see-through perspective view of a linear actuator for motion simulators in accordance with the present disclosure.

Referring to the drawings and more particularly to FIG. 2, there is illustrated at 10 a linear actuator of the type used for motion simulators. The linear actuator 10 is well suited to be used between the ground and a motion platform (i.e., support surface, chair, seat, flight simulator/compartment, etc) to displace the motion platform in synchrony with a sequence of images and/or sound, for instance part of a motion picture, a televised event, a video, a video game, a simulation, haptic event, a virtual reality session, etc. The linear actuator 10 of the illustrated embodiments is an electro-mechanical linear actuator that is driven by a motion controller, or any other appropriate and adapted source of motion signals (e.g., media player, D-cinema projector, internet, etc), i.e., code representing specific motions to be performed. The motion signal is sent to the linear actuator in a suitable format to drive a motor thereof. In an embodiment, at least two of the actuator 10 are used concurrently to support and displace a seat relative to the ground. The linear actuator 10 therefore produces a translational output, along an axial direction thereof, illustrated as X. When reference is made hereinafter to the axial direction, it will refer to the longitudinal axis of the linear actuator 10, unless stated otherwise, and is shown as X in FIG. 2-4.

The linear actuator 10 is an assembly of three groups (i.e., three portions, three sub-assemblies, etc), namely a motor group 12, a structural group 14 and a driven group 16. The motor group 12 and the structural group 14 are only schematically illustrated and briefly detailed, as the details of the present disclosure mostly pertain to the driven group 16. However, for reference, PCT application no. PCT/US2013/072605 describes one example of a motor group 12 and of a structural group 14, and is hence incorporated by reference.

The motor group 12 receives motion signals in electric format, and produces rotational motions corresponding to the motion signals received. The motor group 12 is therefore connected to a source of motion signals or like electronic equipment. The motor group 12 is operatively connected to the driven group 16 to transmit its rotational motions thereto.

The structural group 14 houses the driven group 16, and operatively connects the motor group 12 to the driven group 16. Moreover, the structural group 14 may be the interface between the linear actuator 10 and the motion platform, the ground, or a supporting structure.

The driven group 16 converts the rotational motions from the motor group 12 into linear motions along direction X, and is the output of the linear actuator 10. The driven group 16 may be the interface between the linear actuator 10 and the ground or a base, and is displaceable relative to the structural group 14.

Motor Group 12

Referring to FIG. 2, a few components of the motor group 12 are shown in greater detail. For simplicity purposes, components of the motor group 12 are numbered 20 and 21.

The motor group 12 has an electric motor 20. The electric motor 20 is a bi-directional motor of the type receiving an electrical motion signal, to convert the signal in a rotational output proportional to the motion signal, in either circular directions, in direct drive. Accordingly, the electric motor 20 has an output shaft 22 in FIG. 2. By way of example, the electric motor 20 is a brushless DC motor. This type of electric motor is provided as an example, and any other appropriate type of motor may be used. The output shaft may project in the axial direction X, but rotates about X. A coupling component 23 in FIG. 2 (e.g., a motor coupler) is connected to the output shaft so as to be integral therewith (e.g., by way of a set screw, etc). Hence, the motor coupler rotates with the output shaft. The motor coupler will be coupled to the driven group 16 as described hereinafter, or may alternatively be part of the driven group 16.

A body of the motor 20 has a connection flange 21. The connection flange 21 uses appropriate fasteners such as bolts (not shown), washers, and the like to connect the motor to the structural group 14. Any appropriate type of connection means may be used as alternatives to the flange 21 and fasteners.

Structural Group 14

Referring to FIG. 2, components of the structural group 14 are shown in greater detail. For simplicity purposes, components of the structural group 14 are numbered between 40 and 46.

The structural group 14 comprises a casing 40, also known as a cover, housing, or the like. In the illustrated embodiment, the casing 40 is a monolithic piece. The casing 40 is a main structural component of the linear actuator 10, as it interfaces the motor group 12 to the driven group 16, and may also interface the linear actuator 10 to a motion platform. The casing 40 may have a flange 41 located at a proximal end of the casing 40, for connection with the flange 21 of the motor group 12.

Referring to FIG. 2, the casing 40 is a tubular component that defines an inner cavity 42 that houses a part of the driven group 16. The inner cavity 42 may be segmented in various sections. One such section is delimited by a joint surface 44, which opens up to an open distal end 43 of the casing 40. The joint surface 44 is the surface against which a moving component of the driven group 16 will slide. A portion of the driven group 16 will exit through the open distal end 43, when expanding in direction X.

There may be other sections to the casing 40, such as a void in which components of the driven group 16 may move without obstructions. Another section may be defined by a seat for a bearing of the driven group 16, as described hereinafter. It is also considered to position a sleeve into the joint surface 44 to act as an interface for a sliding component of the driven group 16, as described hereinafter. The sleeve may consist of a material having a relatively high hardness for a relatively low coefficient of friction, such as a sleeve of PTFE or like materials.

One or more guides, received in bores such as bore 45, may projects through the joint surface and into the inner cavity 42. The end of the guide is within the inner cavity 43 of the casing 40, and will serve as guide for a sliding component of the driven group 16, to ensure linear motion, i.e., to serve as an anti-rotation guide for the sliding component of the driven group 16. Moreover, the guide may act as a stopper to delimit the stroke of the linear actuator 10, although not in the illustrated embodiment. In the illustrated embodiment, the guide is a bolt with its bolt head accessible from an exterior of the casing 40, i.e., at the bore 45. A ventilation hole may also be defined in the casing 40, to allow air to escape from the interior of the linear actuator 10. The ventilation hole may be protected by a filter or screen.

A connection flange 46 is secured to the distal end of the casing 40, and may be provided with connection throughbores, etc, to be secured to a structure, to a motion platform, etc. The connection flange 46 is one of multiple connection arrangements for the linear actuator 10.

The above details regarding the motor group 12 and the structural group are given as exemplary embodiments.

Driven Group 16

Figure 3:
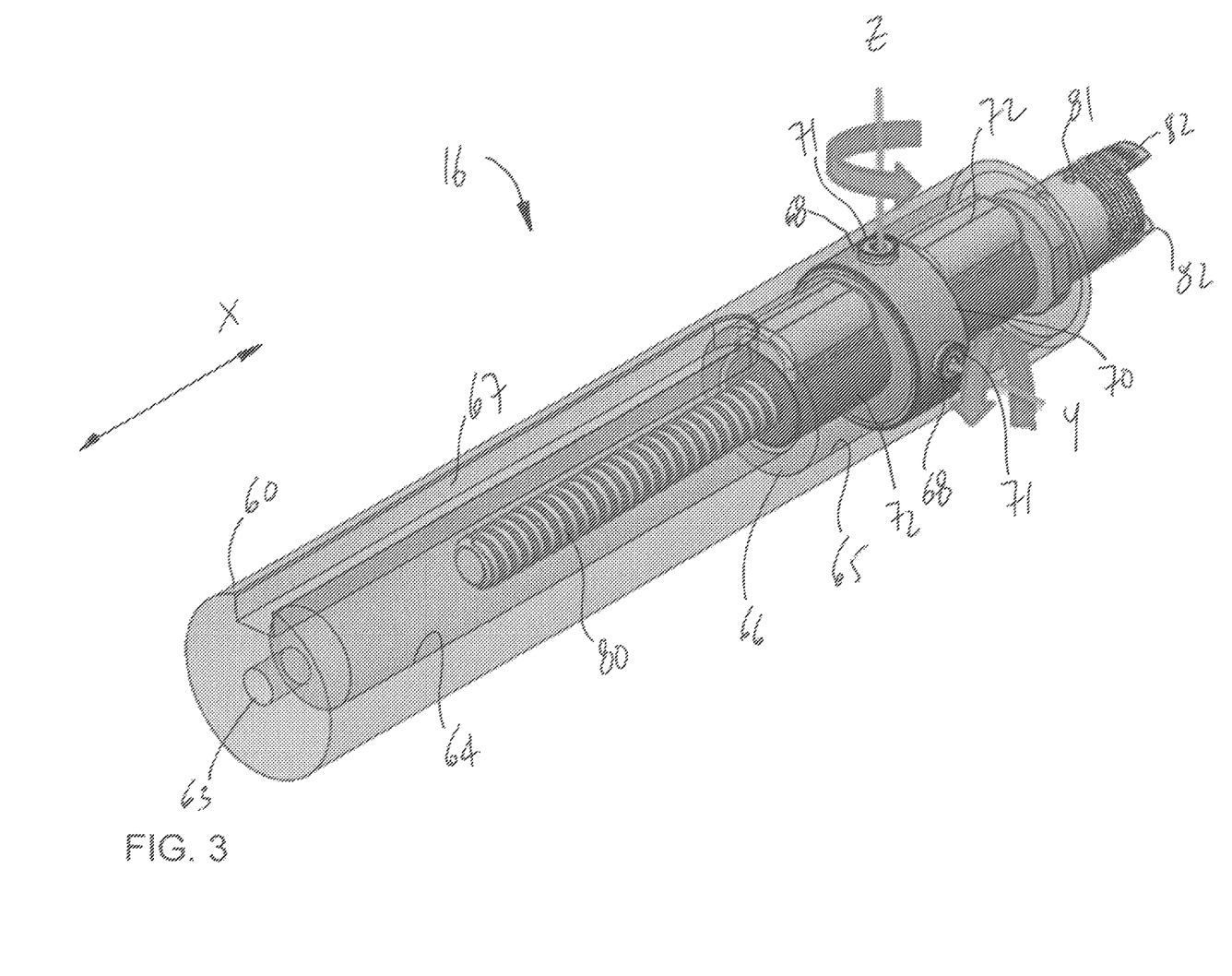
FIG. 3 is a see-through perspective view of a driven group of the linear actuator for motion simulators of FIG. 2 in a retracted condition.
Figure 4:
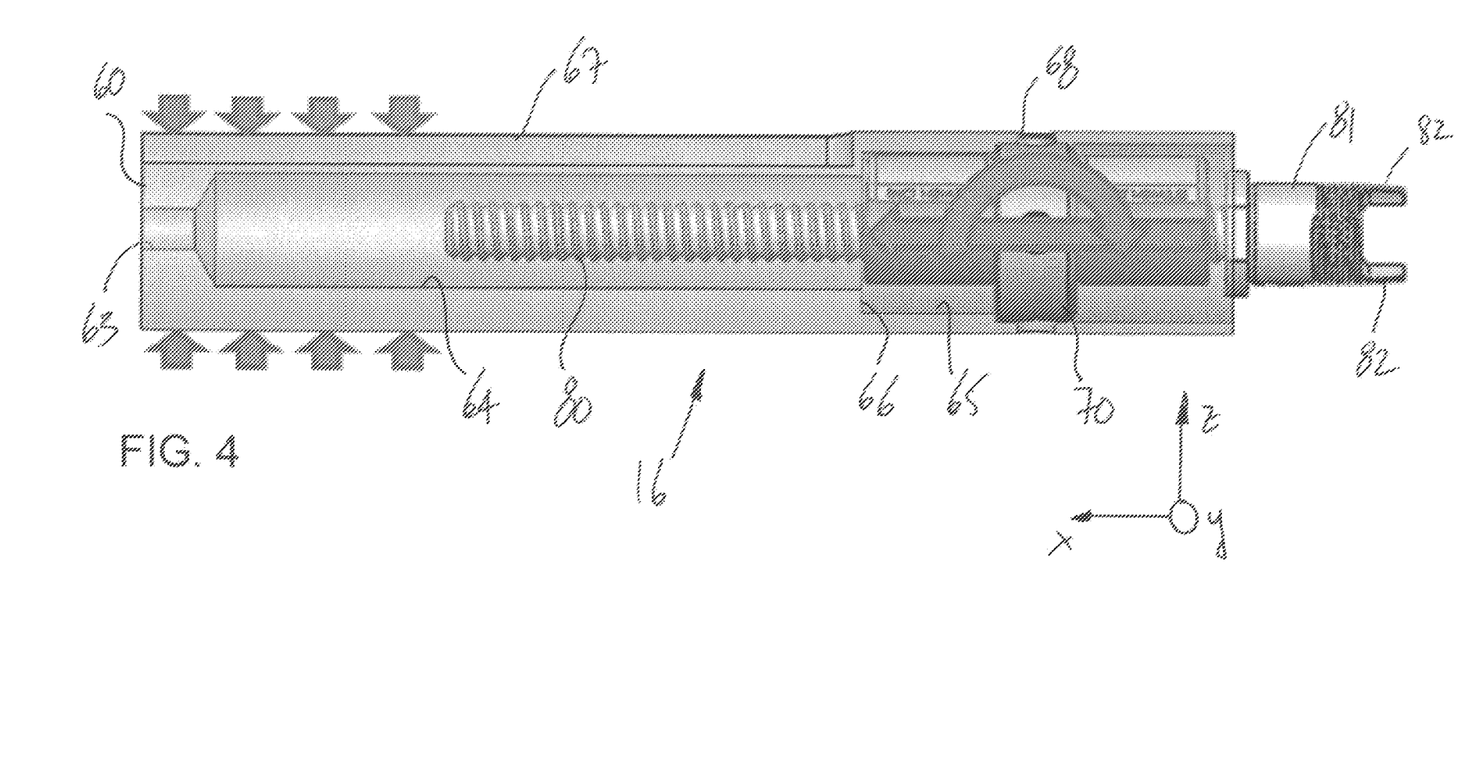
FIG. 4 is a see-through elevation view of the driven group of the linear actuator for motion simulators of FIG. 3.

Referring to FIGS. 2 to 4, components of the driven group 16 are shown in greater detail. For simplicity purposes, components of the driven group 16 are numbered above 60.

The driven group 16 has a sliding tube assembly comprising sliding tube 60 (visible in FIGS. 3 and 4), also known as a piston. The sliding tube 60 is the main moving component of the driven group 16. The sliding tube 60 is fitted within the inner cavity 43 of the casing 40, and is sized so as to be in sliding contact with the sleeve or the joint surface 44 defining the inner surface of the casing 40 (FIG. 2). Hence, the sliding tube 60 may move in the axial direction X in the inner cavity 43 of the casing 40, such that a distal end of the sliding tube 60 may project out of the distal end of the casing 40 by a variable selected distance. In FIGS. 2-4, the sliding tube 60 is shown within the casing 40 in a retracted condition of the linear actuator 10, but a substantial portion of the sliding tube 60 may be fully extended out of the casing 40, in an extended condition of the linear actuator 10.

In FIG. 2, an interface 61 is therefore provided at a distal end of the sliding tube 60, outside of the casing 40. The interface 61 may be a ground or base interface if the linear actuator 10 is oriented with the interface 61 downward. For instance, the interface 61 may lie directly on the ground, may be a part of a joint, or may be connected to a joint. Alternatively, if the linear actuator 10 is oriented with the interface 61 upward, the interface 61 is connected to the motion platform (e.g., underside of a seat or seat frame), for instance by way of a joint. The interface 61 is shown in the figures as having a frusto-spherical shape secured by a bolt (FIG. 2) to a tapped bore 63 in the sliding tube 60 (FIG. 4). The frusto-spherical interface 61 and bolt 62 are one solution among many others that can be used as interface at the end of the sliding tube 60.

Referring to FIGS. 3-4, the inner cavity 64 is shown as extending along a substantial portion of the length of the sliding tube 60. A proximal section 65 of the inner cavity 64 is shown as having a greater inner diameter than the distal section, with shoulder 66 being the demarcation between the two sections.

On an outer surface of the sliding tube 60, a guide channel 67 is formed. The guide channel 67 is parallel to the axial direction X. In operation, the end of the guide (received in the bore 45 (FIG. 2)) will be received in the guide channel 67. In the illustrated embodiment, the sliding tube 60 features a single guide channel 67. However, more of the guide channel 67 could be used, with a corresponding number of the guide 49.

Bores 68 are also defined through the wall of the sliding tube 60. The bores 68 are shown as having their respective axes in a same transverse plane of the sliding tube 60, the axial direction X being substantially normal to the transverse plane. Moreover, the axes of the pair of bores 68 are shown as being perpendicular to one another, in the transverse plane. The bores 68 are located in the proximal section of the sliding tube 60, and are of circular cross-section. While the transverse plane and the perpendicular relation are well suited for optimized operation of the linear actuator 10, other arrangements are considered.

The sliding tube assembly further comprises a carriage 70 that is operatively connected to the sliding tube 60. The carriage 70 is received in the inner cavity 65, in the proximal section. The carriage 70 has a disk-like shape, and has its cylindrical peripheral surface contact the surface of the inner cavity 65 of the sliding tube 60—disk including any peripheral shape (i.e., not only circular) based on the shape of the inner cavity of the sliding tube 60, i.e., circular, oval, square, squircle, etc. Alternatively, according to an embodiment, a member integral to the sliding tube 60 is used instead of the carriage 70, such as an inner wall integral to the sliding tube 60 and projecting radially inwardly from a surface of the inner cavity of the sliding tube 60.

A pair of rollers 71 project radially from the carriage 71, and are received in the bores 68, in the manner shown in FIGS. 3 and 4. Hence, a pair of rotational joints are formed, between each combination of bore 68 and roller 71. Movement is limited at these rotational joints, due to the close fitting nature of the carriage 70 in the sliding tube 60, but there are two rotational degrees of freedom between the carriage 70 and the sliding tube 60, around axis Y and Z, conveniently the axes of the bores 68 and rollers 71 in FIGS. 3 and 4. A suitable close fitting relation between the carriage 70 and the sliding tube 60 is a play of 0.010"±0.004", given as an example, i.e., movement in the transverse plane. More or less of a play may be used as well, to increase or decrease the angular rotation between the carriage 70 and the sliding tube 60. Likewise, a minute amount of play is provided at each set of bore 68 and roller 71, which minute amount of play allows the two rotational degrees of freedom between the carriage 70 and the sliding tube 60. Hence, the sliding tube 60 and the carriage 70 move concurrently in direction X, while some rotational degrees of freedom are possible therebetween, about axes transverse to direction X. While FIGS. 2-4 show that the rollers 71 are connected to the carriage 70 and received in the bores 68, it is considered to have the opposite configuration of bores in the carriage 70 and rollers projecting radially inwardly from into the sliding tube 60 and into the bores of the carriage. The rollers 71 may include a bearing of any kind. Alternatively, the rollers may simply be a cylindrical post with a low-friction surface in contact with the surfaces of the bores 68. As an alternative to the assembly described above, with the play in each set of bore 68 and roller 71, it is contemplated to form a universal joint arrangement between the carriage 70 and the sliding tube 60 to allow the two rotational degrees of freedom between the carriage 70 and the sliding tube 60.

A pair of traveling nuts 72 are secured to opposite sides of the carriage 70 (or like member if the sliding tube assembly is without the carriage 70), whereby the carriage 70 is centered between the traveling nuts 72. The traveling nuts 72 may each have a threaded end by which they are screwingly connected to a tapped bore of carriage 70, so as to move integrally with the carriage 70. In an embodiment, the thread pitch of the threaded ends differs from the thread pitch of the lead screw with which the traveling nuts 72 will be operating, to reduce the risk of a loosening of the traveling nuts 72 relative to the carriage 70. The thread pitch of the threaded ends may also differ one from the other. The traveling nuts 72 may be any appropriate type of mechanism operating with a lead screw (i.e., threaded shaft) to convert a rotation of the lead screw into a translation of the sliding tube 60 and carriage 70 in direction X. For instance, the traveling nuts 72 each are a ball screw unit. One suitable ball screw unit is a SKK rolled ball screw with a return tube, such as a SH type ball nut. However, many other types of traveling nuts 72 are considered as alternatives to rolled ball screws.

Referring concurrently to FIGS. 2 to 4, a threaded shaft 80 (i.e., lead screw, bolt) is in operative engagement with the traveling nuts 72. The threaded shaft 80 is coupled to the electric motor 20, to transmit the rotational output of the motor 20 to the sliding tube 60. The threaded shaft 80 has a helical raceway that is compatible with the traveling nuts 72, i.e., to receive therein the balls of the traveling nuts 72. As the traveling nuts 72 are fixed to the carriage 70, and as the sliding tube 60 is limited to translational movements due to the interaction between the guide in the bore 45 and the guide channels 67, a rotation of the threaded shaft 70 results in a translation of the traveling nuts 72.

The threaded shaft 80 is rotatably connected to the casing 40, to rotate about its longitudinal axis (substantially parallel to the axial direction), while being retained from translating. A bearing may be the interface between the threaded shaft 80 and the casing 40. The bearing may be a ball bearing, a roller bearing, a ball-less bearing, or any appropriate type of bearing.

A shaft coupler 81 is provided to couple the shaft 80 to an equivalent motor coupler. The shaft coupler 81 may also be the interface between the bearing and the threaded shaft 80. A pair of protrusions 82 project in the proximal direction and will be coupled to fingers of a motor coupler of the motor 20, for transmission of a rotational output from the electric motor 20 to the shaft 80, in one of numerous possible coupling configurations. In other configuration, the threaded shaft 80 is integral with or part of the shaft of the motor 20. In such a configuration, coupling would not be required between the motor 20 and the shaft 80.

Now that the various components of the linear actuator 10, an operation thereof is set forth.

The operation will refer to the linear actuator 10 as being oriented such that the interface 61 is facing the ground.

The linear actuator 10 is initially calibrated, in that the position of the sliding tube 60 is known relative to the casing 40. This may be done by any appropriate method, including calibration movements when the linear actuator 10 is turned on, as controlled by a platform controller.

The electric motor 20 receives motion signals and will hence produce rotational outputs proportional to the motion signals, in the selected directions. The rotational outputs will be transmitted through the output shaft, to the threaded shaft 80 via the coupling therebetween.

The carriage 70 and the traveling nuts 72 will convert rotations of the threaded shaft 80 into a translation of the sliding tube 60 along the axial direction. As the sliding tube 60 is connected to the ground or a base, the resulting action will be a translational motion of the motor 20 and casing 40 relative to the ground or a base. As the motion platform is connected to the motor 20 or the casing 40, the motion platform will move with the motor 20 and the casing 40. It is pointed out that additional degrees of freedom may be present between any of ground/base, the motor 20/casing 40, and the sliding tube 60, for instance by the presence of joints between the motion platform, the ground/base and the linear actuator 10.

In instances, the sliding tube 60 is connected to the motion platform while the motor 20 and the casing 40 are secured to the ground or to a base. In such a case, the motion platform will move with the sliding tube 60.

Because of the presence of a pair of traveling nuts on opposite sides of the carriage 70, non-axial loads against the sliding tube 60 will be more evenly distributed among the two traveling nuts 72. The increased length of the traveling nuts 72 on the threaded shaft 80 may help in improving the distribution of loads. As a result, the linear actuator 10 having the configuration of FIGS. 2 to 4 may have a longer life than a linear actuator employing the driven group shown in FIG. 1, in which there is a single traveling nut 3. The pair of traveling nuts 72 may be connected directly to the sliding tube 60 (e.g., for instance to an inward flange), without the need for the carriage 70.

Moreover, the presence of at least one rotational degree of freedom in a transverse plane of the carriage 70, resulting from the rotational joints between the carriage 70 and the sliding tubes 60, will also lessen the impact of some loads on the components of the driven group 60, such as the carriage 70 and the traveling nuts 72, for instance by reducing angular tension on the traveling nuts 72 and threaded shaft 80. Although two different rotational degrees of freedom are shown in the embodiments of FIGS. 2 to 4, a single one may reduce the effect of some loads on the driven group 16.

It is pointed out that the concept of using a pair of traveling nuts 72 on opposite sides of the central carriage 70 may be used in combination or separately with the concept of having one or more rotational degrees of freedom between the sliding tube 60 and the carriage 70.

The invention claimed is:

1. A linear actuator comprising:
a motor for producing a bi-directional rotational output;
a casing connected to the motor at a proximal end, the casing having an inner cavity defining a joint surface;
a threaded shaft within the inner cavity of the casing and actuated by the motor for rotation;
a sliding tube assembly having a sliding tube in sliding arrangement with the inner cavity of the casing for moving in translation in an axial direction relative to the casing; and
a pair of traveling nuts connected to the sliding tube assembly for moving with the sliding tube in the axial direction, both of the traveling nuts being operatively engaged to the threaded shaft for converting a rotational motion of the threaded shaft into a translation of the sliding tube, the traveling nuts being on opposite sides of a carriage of the sliding tube assembly connecting the traveling nuts to the sliding tube, the carriage being positioned in an inner cavity of the sliding tube and having a disk with a throughbore for the threaded shaft to pass through, with the traveling nuts secured to opposite sides of the disk.

2. The linear actuator according to claim 1, wherein the traveling nuts are threadingly engaged to the disk of the sliding tube assembly.

3. The linear actuator according to claim 2, wherein a thread pitch between at least one of the traveling nuts and the disk of the sliding tube assembly is different than a thread pitch of the threaded shaft.

4. The linear actuator according to claim 1, wherein the traveling nuts each are rolled balls screw units, each said rolled ball screw units having balls operatively received in a helical raceway of the threaded shaft.

5. The linear actuator according to claim 1, further comprising a hemi-spherical joint surface at a distal end of the sliding tube for interfacing the linear actuator to a socket of a structure.

6. The linear actuator according to claim 1, further comprising at least one joint providing a first rotational degree of freedom between the carriage and the sliding tube, about an axis transverse to the axial direction.

7. The linear actuator according to claim 6, wherein the axis of the first rotational degree of freedom is perpendicular to the axial direction.

8. The linear actuator according to claim 6, comprising two of said joint, with a first of said joints providing the first rotational degree of freedom, and a second of said joints providing a second rotational degree of freedom about another axis transverse to the axial direction.

9. The linear actuator according to claim 8, wherein the axes of the first rotational degree of freedom and of the second rotational degree of freedom lie in a common plane.

10. The linear actuator according to claim 9, wherein the axial direction is normal to the common plane.

11. The linear actuator according to claim 6, further comprising a play separating an outer surface of the carriage from a surface of the inner cavity, the play being between 0.006" and 0.014".

12. The linear actuator according to claim 6, wherein the at least one joint comprises a cylindrical roller projecting radially from the carriage, and a circular bore in the sliding tube housing the cylindrical roller.

13. A linear actuator comprising:
a motor for producing a bi-directional rotational output;
a casing connected to the motor at a proximal end, the casing having an inner cavity defining a joint surface;
a threaded shaft within the inner cavity of the casing and actuated by the motor for rotation;
a sliding tube in sliding arrangement with the inner cavity of the casing for moving in translation in an axial direction relative to the casing;
a carriage within the sliding tube and connected to the sliding tube for moving with the sliding tube in an axial direction;
a joint providing a first rotational degree of freedom between the carriage and the sliding tube, about an axis transverse to the axial direction;
a second joint providing a second rotational degree of freedom about another axis transverse to the axial direction; and
at least one traveling nut connected to the carriage for moving with the sliding tube in the axial direction, the at least one traveling nut being operatively engaged to the threaded shaft for converting a rotational motion of the threaded shaft into a translation of the sliding tube.

14. The linear actuator according to claim 13, wherein the axis of the first rotational degree of freedom is perpendicular to the axial direction.

15. The linear actuator according to claim 13, wherein the carriage is a disk with a throughbore for the threaded shaft to pass through.

16. The linear actuator according to claim 13, further comprising a play separating an outer surface of the carriage from a surface of the inner cavity, the play being between 0.006" and 0.014".

17. The linear actuator according to claim 13, wherein the at least one joint comprises a cylindrical roller projecting radially from the carriage, and a circular bore in the sliding tube housing the cylindrical roller.

18. A linear actuator comprising:
a motor for producing a bi-directional rotational output;
a casing connected to the motor at a proximal end, the casing having an inner cavity defining a joint surface;
a threaded shaft within the inner cavity of the casing and actuated by the motor for rotation;
a sliding tube in sliding arrangement with the inner cavity of the casing for moving in translation in an axial direction relative to the casing;
a carriage within the sliding tube and connected to the sliding tube for moving with the sliding tube in an axial direction, the carriage being a disk with a throughbore for the threaded shaft to pass through;
at least one joint providing a first rotational degree of freedom between the carriage and the sliding tube, about an axis transverse to the axial direction; and
at least one traveling nut connected to the carriage for moving with the sliding tube in the axial direction, the at least one traveling nut being operatively engaged to the threaded shaft for converting a rotational motion of the threaded shaft into a translation of the sliding tube.

19. The linear actuator according to claim 18, wherein the axis of the first rotational degree of freedom is perpendicular to the axial direction.

20. The linear actuator according to claim 18, further comprising a play separating an outer surface of the carriage from a surface of the inner cavity, the play being between 0.006" and 0.014".

21. The linear actuator according to claim 18, wherein the at least one joint comprises a cylindrical roller projecting radially from the carriage, and a circular bore in the sliding tube housing the cylindrical roller.

* * * * *